March 25, 1930.  G. E. HALLENBECK  1,751,994
NARROW FRAME DRILL PRESS
Filed July 20, 1921     5 Sheets-Sheet 1

March 25, 1930.

G. E. HALLENBECK 1,751,994

NARROW FRAME DRILL PRESS

Filed July 20, 1921

Patented Mar. 25, 1930

1,751,994

UNITED STATES PATENT OFFICE

GEORGE E. HALLENBECK, OF TOLEDO, OHIO, ASSIGNOR TO BAKER BROTHERS, INC., OF TOLEDO, OHIO, A CORPORATION OF OHIO

NARROW-FRAME DRILL PRESS

Application filed July 20, 1921. Serial No. 486,041.

This invention relates to power driven machines.

This invention has utility when incorporated in machine tools of the drill press type.

Referring to the drawings:—

The machine tool of this disclosure comprises a base (Fig. 1) having an auxiliary base or column 2 rising therefrom. This column 2 is provided with a pair of guides 3 to which may be clamped by means of bolts 4 a work table 5. This table 5 has an intermediate work carrying portion 6 surrounded by a trough 7 into which the cutting oil or lubricant may drain. This trough 7 is shown as having upwardly outwardly inclined wall 8 permitting the ready removal of chips from this trough.

Figure 1:
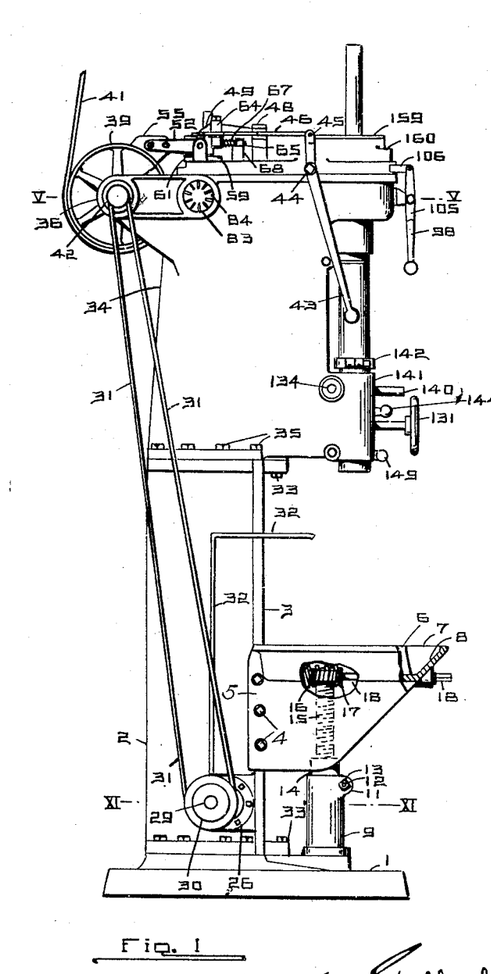
Fig. 1 is a side elevation, with parts broken away, of an embodiment of the invention in a drill press.
Figures 10, 11, 12, 13:
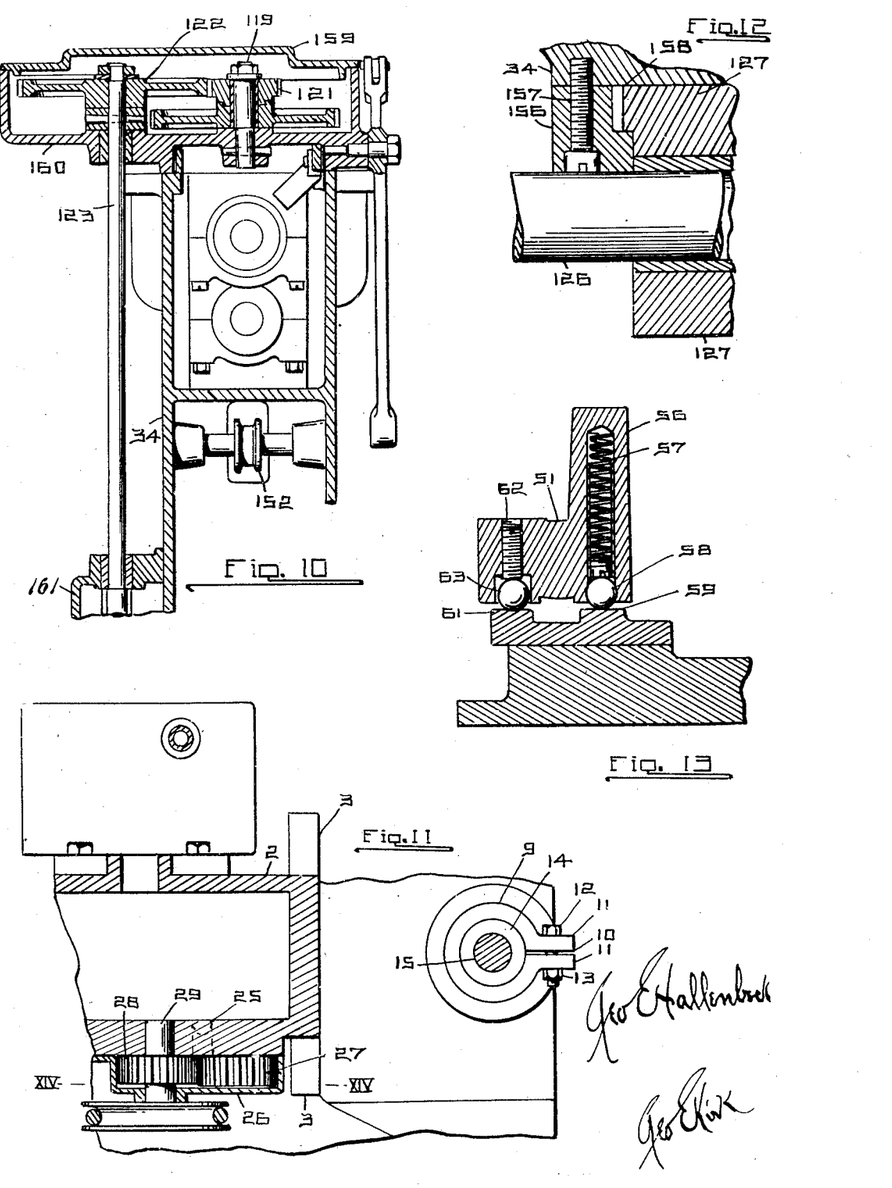
Fig. 10 is a section on the line X—X, Fig. 8.
Fig. 11 is a partial section on the line XI—XI, Fig. 1.
Fig. 12 is a partial section on the line XII—XII, Fig. 17.
Fig. 13 is a partial section on the line XIII—XIII, Fig. 6.

The base 1 is shown as having a stem 9 rising therefrom, the stem having a gap 10 (Fig. 11) with ears 11 extending therefrom so that a bolt 12 may be loosened up by its nut 13 and thereby have this stem 9 operate as an adjustable clamp for engaging long nut 14. When this clamp is loosened the nut 14 is free to travel in this stem 9. This nut 14 is engaged by screw 15 extending up into the table and carrying gear 16 operated by gear 17 upon shaft 18. (Fig. 1).

This feature of adjustment means that the table may be given a position close to the base 1 at the collapsed or starting position. When for shorter work or bringing up closer to the spindle, the table may be lifted for the full travel of the screw 15. When the table 5 is so lifted, clamps 4 may be set to hold this table 5 to the guides 3. The clamp 12, 13, may be loosened, and the shaft 18 then operated to draw the nut 14 out of the stem 9. When so withdrawn but not clear of the stem 9, the clamp 12, 13, may be re-set and with this nut thus held the bolts 4 may be operated to release the table 5 from the guides 3 and the table 5 further lifted as desired.

Figures 3, 4:
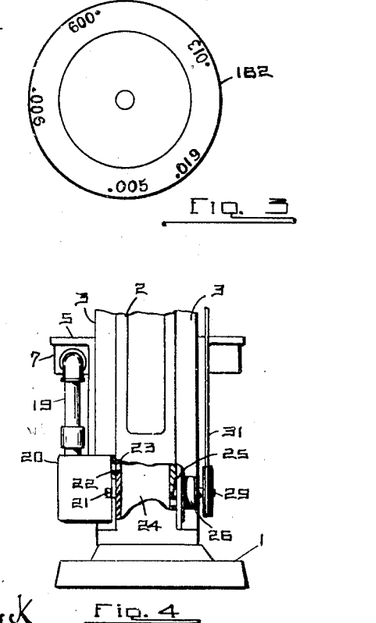
Fig. 3 is a detail view of a removable indicator plate for use in setting the feed adjustments.
Fig. 4 is a fragmentary view in rear elevation of the frame base, parts being broken away.

From the trough 7 of this table 5 extends pipe 19 (Fig. 4) for overflow of lubricant into box 20. This box 20 is mounted by bolts 21 to have its side opening 22 register with the opening 23 in the column 2 so that this box 20 may serve as a sediment receiving chamber or reservoir, with the clear liquid overflowing into lubricant reservoir 24 in the column 2.

This column 2 has its reservoir 24 in communication by opening 25 with pump housing 26 having floating loosely therein follower rotary piston 27 to be driven by driving rotary piston 28 (Figs. 11, 14) fast on shaft 29 actuated by pulley 30 carrying belt 31. This rotary pump is accordingly effective to circulate the lubricant from the clear lubricant chamber 24 in the column 2 by way of pipe 32 for re-delivery to the work.

Figures 5, 6, 7:
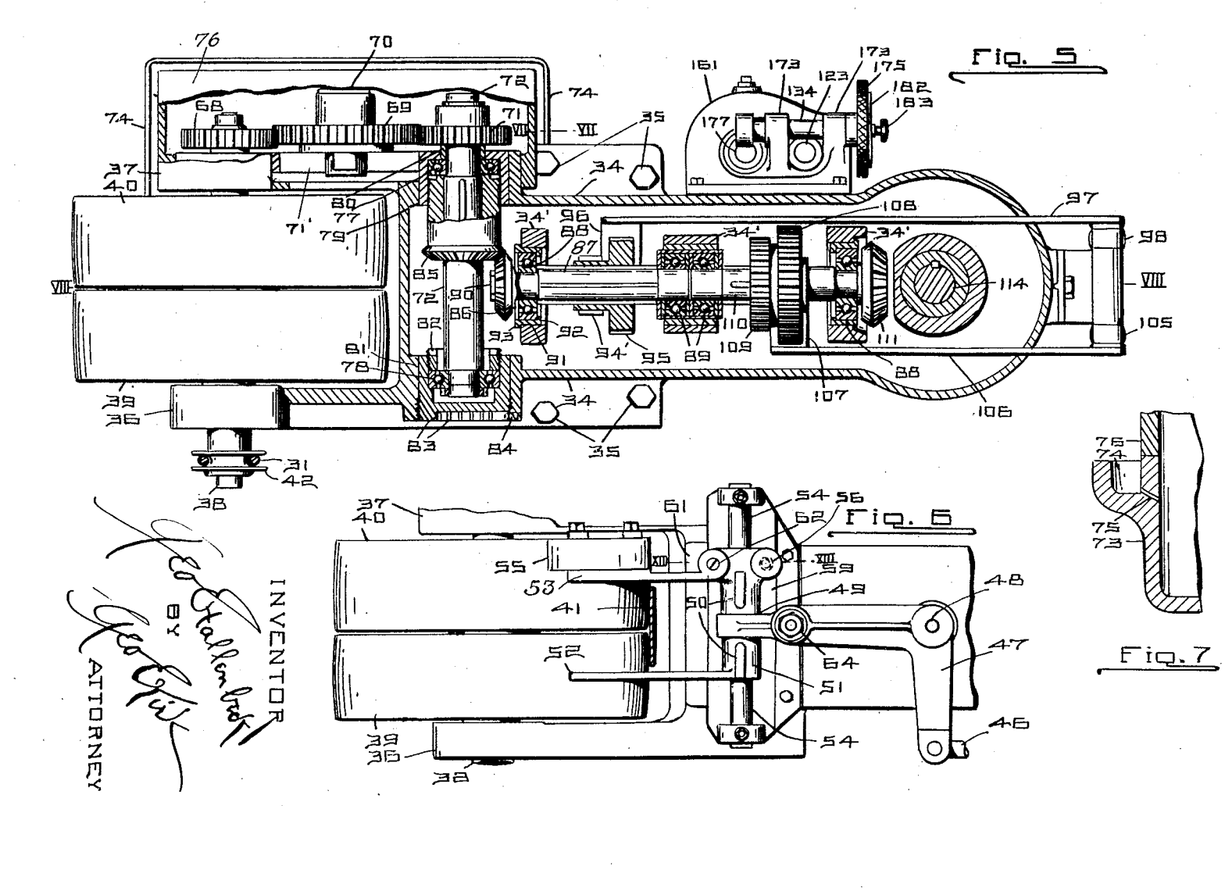
Fig. 5 is a section on the line V—V, Fig. 1.
Fig. 6 is a plan view showing features of the belt control for the drive.
Fig. 7 is a detail view on an enlarged scale on the line VII—VII, Fig. 5.

The column 2 carries over the table 5 an overhang or toe hold 33 between the guides 3. Accordingly, in mounting head 34 by bolts 35 upon the column 2 there is an extension of the base 2 for more stable balancing of the head 34. This head 34 is shown as of narrow form rearward from the table 5. On its after portion this frame 34 carries bearings 36, 37 (Fig. 5) for shaft 38. Mounted on this shaft 38 between the bearings 36, 37, are loose pulley 39 and fast pulley 40 to be driven by belt 41. Outward from the bearing 36, this shaft 38 carries pulley 42 as the driving pulley for the belt 31 operating the lubricant circulating pump.

Near the front of the frame 2, 34, and adjacent the position of the operator who may be tending work at the table 5 is handle 43 having fulcrum bearing 44 and short arm 45 connected by link 46 to angle lever 47, (Figs. 1, 6 and 8) on the fulcrum bearing 48. Rocking of this handle 43 will cause the angle lever 47 through its arm 49 engaging between lugs 50 on bearing 51 to slide belt shifter fork 52, 53, along a guide 54 in moving the belt 41 from loose pulley 39 to fast pulley 40, and vice versa.

The belt shifter fork 52 is shown as carrying a brake shoe 55. This bearing 51 carries socket 56 (Figs. 6, 9, 13) in which is disposed a spring 57 normally thrusting downward a ball 58 against track 59 thereby tending to tilt the forks 52, 53, together with the brake shoe 55, downward toward the pulleys 39, 40, by rocking on the guide 54. As the bearing 51 rides to and fro on the guide 54 the ball 58 travels along track 59. Parallel with this track 59 and on the opposite side of the guide 54 is a track 61 which is lower toward the pulley 39. Set screw 62 may serve to positively adjust ball 63 against this track 61. Accordingly, as the lever 43 is pulled toward the front of the machine to shift the belt 41 from the loose pulley 39 to the fast pulley 40, the ball 63 rides up on the cam track 61 and lifts the brake shoe 55 away from the fast pulley 40 as the belt 41 travels upon the fast pulley 40. This tilting of the shoe 55 away from the pulley 40 is against the resistance of the spring 58.

Upon shifting the hand lever 43 inward toward its lower portion, that is, back from the front of the machine tool, the belt 41 is shifted from the fast pulley 40 back upon the loose pulley 39. The roller 63 now rides downward on the cam track 61 and the spring 57 accordingly rocks the bearing 51 to throw the forks 52, 53, toward the pulleys thereby crowding the brake shoe 55 against the pulley 40 and automatically stopping the rotation of the first or main drive shaft 38 of the machine tool.

In order to safeguard the throwing of the belt shifting lever 43 against accidental shifting toward an intermediate position, the arm 49 of the angle lever 47, 48, carries pin 64 (Figs. 1, 8) as a bearing for rod 65 slidable in guide 66 below the arm 49. Mounted upon this rod 65 between the bearing 64 and the fixed guide block or bearing 66 is a compression helical spring 67. As this rocking of the angle lever 47, 49, is upon an arc and the block 66 is of less radius to the bearing 64 than the bearing 64 is to the arm 49, the spring 67 is compressed a greater degree at the medial position and as it tends to expand there is the assistance in the shifting of the lever 43 for effecting the thrust of the belt 41 at once medial position is passed in either direction of shifting.

The shaft 38 remote from the pulley 42 carries gear 68 in mesh with intermediate gear 69 upon shaft 70. This gear 69 is in mesh with a gear 71 on shaft 72. These gears 68, 69, 71, are slip change speed gears, the shaft 70 being adjustable along guide slot 71' between the shafts 68, 72, to permit taking care of various diameters of gears therebetween. This first drive change speed gear train is mounted in housing 73 (Fig. 7) carried by the frame 34 and is designed so that the gears may run in oil or be amply lubricated. To this end the gear housing has its lower portion 73 provided with an annular lubricant receiving trough 74 (Fig. 7) with drip vents 75 therefrom back into the housing so that there may not be spilling of lubricant down the side of the frame of this machine tool should any such seep out of the housing 73 through the joint connecting the cap 76 thereto.

Figure 2:
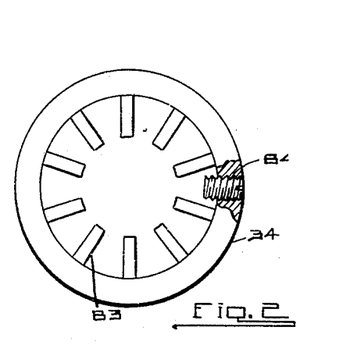
Fig. 2 is a detail view on an enlarged scale of a gear mesh adjusting feature.

The shaft 72 is mounted in roller bearings 77, 78. The roller bearing 77 is mounted in a sleeve 79 having toward the outer side of the frame 34 a flange 80. The roller bearing 78 is mounted in a cap sleeve 81 in which it is held in position by externally threaded nut 82. This cap sleeve 81 has threaded engagement with the frame 34. The bearings 77, 78, seat against the intermediate enlarged portion of the shaft 72. The nut 81 has radial slots 83 (Figs. 1, 2, 5) permitting engagement by a wrench for adjusting the longitudinal position of the shaft 72. When the adjusted position desired is obtained, set screw 84 may lock the parts in such desired assembly. This axial adjustment of the shaft 72 effects accurate meshing adjustment for bevel gear 85 on the shaft 72 as to its driving relation with bevel gear 86 on shaft 87.

This shaft 87 extending in the plane of the shafts 38, 72, and at right angles to these parallel shafts 38, 72, is mounted in roller bearings 88, 89. The bearing 89 is loosely mounted in the housing 34'. The bevel gear 86 is keyed in firmly locked position on the shaft 87 by nut 90. The bearing 88 is mounted in a sleeve 91 as an embracing means for the bearing having inwardly extending flange 92 away from the oppositely facing bevel gear 86. This sleeve 91 toward the bevel gear 86 has an outwardly extending flange 93 to engage the frame housing 34. A set screw 94 serves to hold this flange 93 of the sleeve 91 in position as to the housing 34'. Accordingly, the axial thrust upon this shaft 87 from the bevel gear 86 is taken by bearing 88 through the flange 92, and sleeve 91 to the flange 93. There is accordingly no working load only emergency lunges upon sleeve anchoring screw 94 having washer 93' in a cut out portion of the flange 93.

Splined on this shaft 87 is pinion 94' and gear 95, mounted together and engaged by fork 96 (Figs. 5, 8) connected to slide rod 97 actuable by hand lever 98 in front of the machine tool. With the gears 94', 95, shifted toward the bevel gear 86 the pinion 94' is thrown into mesh with gear 99 upon horizontal shaft 100 mounted in the bearings 101 in the frame 34' below and parallel to the shaft 87. Had the lever 98 been operated in the opposite direction, that is to pull the slide 97 forwardly in the frame 34, the gear 95 would have been thrown into mesh with pinion 102 on the shaft 100 thereby driving the shaft 100 at a greater speed than when driving through the gear 99.

Figures 8, 9:
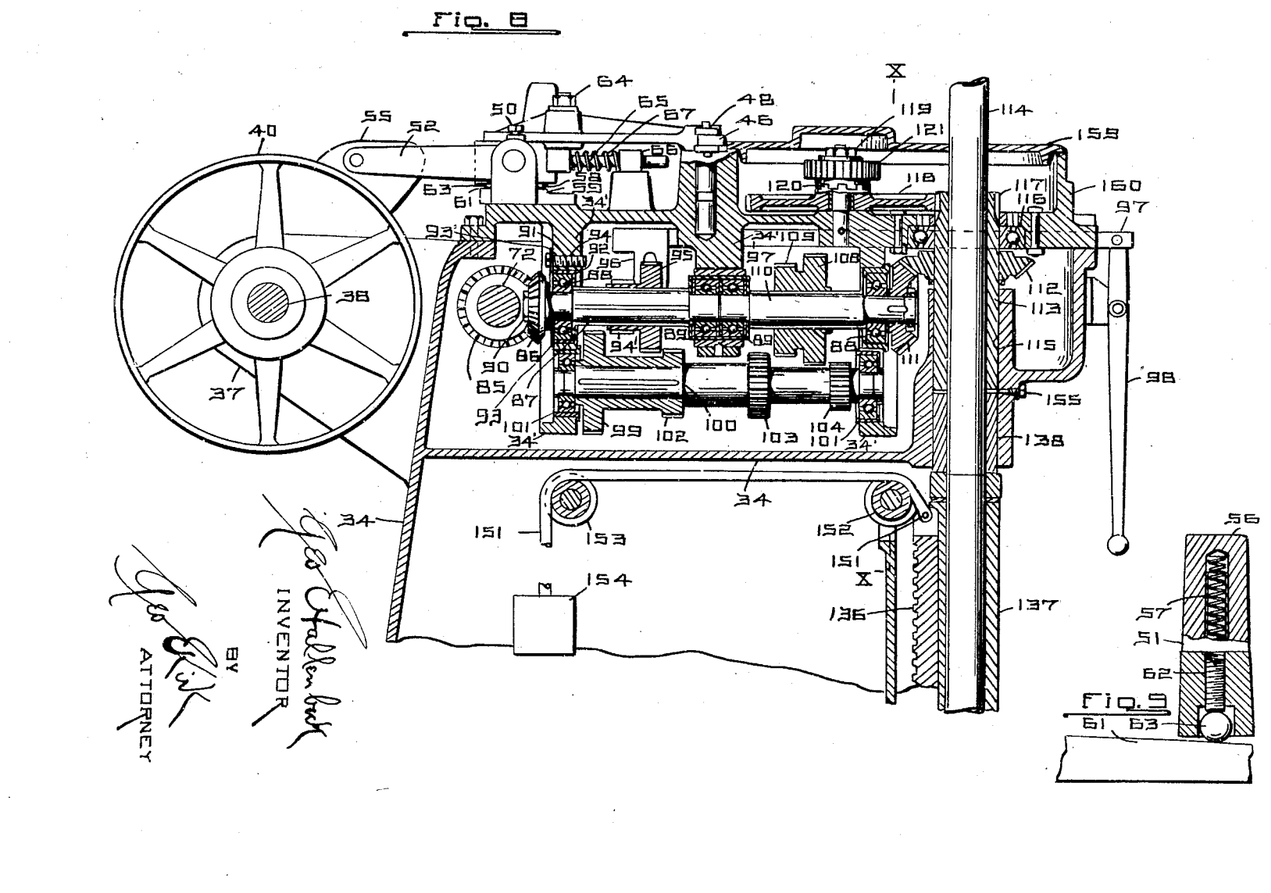
Fig. 8 is a section on the line VIII—VIII, Fig. 5.
Fig. 9 is a fragmentary detail view of features of the brake control.

This shaft 100 carries additional gears 103, 104 (Fig. 8). Parallel to the lever 98 and also in front of the machine tool, but on the opposite side thereof, is hand lever 105 connected to slide 106 (Fig. 5) having fork 107 for sliding gears 108, 109, splined on shaft 110 into mesh with gear 103 for slight reduction in speed of rotation of the shaft 110 as to the shaft 100, while if the gear 108 be thrown into mesh with the gear 104, there is greater speed reduction for the driving of the shaft 110 from the shaft 100. Accordingly, the hand levers 98, 105, should each be thrown into some driving relation for transmitting driving power from the shaft 87 to the axially aligned shaft 110.

This shaft 110 axially in alignment with the shaft 87 is mounted in bearings 89, 88, similar to those for the shaft 87. This shaft 110 beyond the bearing 88 has bevel gear 111 in mesh with bevel gear 112 fast with sleeve 113 splined to rotate vertical drill spindle 114. This sleeve 113 is mounted in cylindrical bearing 115 of the frame 34 and in its extent is less than the full length of the guide bearing 115. Just above the gear 112 the load of this sleeve 113 is carried by anti-friction bearing 116. Upon the opposite side of this bearing 116 from the sleeve driving gear 112, this sleeve 113 has gear portion 117 as a feed train drive for the spindle 114. This toothed portion 117 of the sleeve 113 is in mesh with a gear 118 upon vertical shaft 119. Lug extension 120 on the gear 118 serves to connect slip change gear 121 with this gear 118. This gear 121 (Fig. 10) is in mesh with gear 122 on vertical shaft 123 extending downwardly to a feed rate adjustment drive in housing 161 carried by the frame 34. These gears 121, 122, are slip change speed gears for interchange or substitution in varying the feed drive for the spindle.

From this feed rate adjustment drive box the shaft 123' (Figs. 17, 18) extending downward outside the frame 34 to the right of the operator, with the operator in front of the machine tool, carries at its lower portion bevel gear 124 in mesh with bevel pinion 125 loosely mounted on shaft 126 (Fig. 12) held by bracket 127 (Fig. 17) to swing from bearing 128. The bearing 128 is mounted on the frame 34 to have its axis intercept the axes of the shafts 123, 126. This bevel gear 125 has jaw clutch hub 129 (Fig. 18) which may be engaged by jaw clutch collar 130 fast on the shaft 126 as pulled into or out of engagement by hand wheel 131 on this shaft 126.

In the feed drive train, this bevel gear 125, as driven from the bevel gear 124, rotates the shaft 126, and with it worm 132 in mesh with worm wheel 133 on shaft 134 mounted in the frame 34 below and at right angles to the shaft 110. This shaft 134 (Fig. 18) carries pinion 135 in mesh with rack 136 on supplemental sleeve 137 mounted on the spindle 114 below the sleeve 113 and spaced from the sleeve 113 by auxiliary sleeve or shoulder providing section 138 keyed to the spindle 114. The sleeve 137 is loosely mounted on the spindle 114 and supported by anti-friction bearing (not shown).

For manual feeding of the spindle 114 rapidly, that is, without the necessity for accurate adjustment, arms 140 on the shaft 134 may be used. This operation occurs before the worm 132 is reset into mesh with the worm wheel 133. When it is desired to have more close adjustment in the feeding or setting of the spindle 114, the worm 132 is brought into mesh with the worm wheel 133 then the hand wheel 131 on the shaft 126 may be pushed inwardly toward the back of the machine tool so that the shaft 126 is not clutched with the bevel gear 125, then rotation of the hand wheel 131 will serve through the worm 132 to operate the worm wheel 133 in giving the close adjustment for positioning the drill spindle 114 as to the work.

The frame 34 carries bearing 141 as a guide for the sleeve 137. Above this bearing 141 the sleeve 137 may carry (Figs. 1, 17, 18) an adjustable collar 142 provided with a stop or trip pin 143 which is the downward travel of the spindle 114 may depress lever 144 rocking it on its fulcrum 145 fixed with the frame 34 to lift its notched arm 146 clear of holding trigger 147 so that the weight of the bracket 127 will swing this bracket on its bearing 128. The trigger 147 as it shifts carries with it engaging roller 148, and also rocks the handle 149 upward on its fulcrum bearing 150. As the bracket 127 thus moves downward it carries worm 132 out of meshing engagement with the worm wheel 133 and accordingly the feed driving of the spindle 114 is forthwith stopped.

To re-seat the machine tool for driving, the spindle 114 must be lifted. As the drive is released from the spindle 114 by the tripping of the worm 132 clear of the worm wheel, cable 151 (Fig. 8), connected to the sleeve 137, pulls this sleeve and the spindle 114 upward as to the frame 34. This action is brought about by the travel of this cable 151 over guide pulleys 152, 153, as actuated by the counterweight 154 in the hollow column 2, 34, of the frame. In this upward or recover travel of the spindle 114, together with sleeves 137, 138, the sleeve 138 moves into the guide bearing 115 as an air cushion or dashpot. The quick upward recover travel is due to the spindle and shifted parts being overcounterweighted by the counterweight 154. There may be an adjustable vent 155 for adjusting the dashpot action of this spindle recovery.

As this frame 127 swings downwardly as to the frame 34 in disconnecting the feed drive, it is held against swinging away from the frame 34 by arc or guide block 156 (Figs. 12, 17, 18) mounted by screws 157 against the frame 34. A lug 158 carried by the bracket 127 rides in the way provided by this block 156 and accordingly holds the block for a straight line downward swing travel in a vertical plane, as well as also keeps the parts aligned for proper meshing between the worm 132 and the worm wheel 133, when this feed drive is manually brought back for a repetition of the cycle of driving operations. This way in the block 156 is of arc form from the axis of the bearing 128 as its center.

Ready access to the slip change gears in the feed train is had by removing minor top plate 159. For access to the main drive shiftable gears in the housing or frame 34, main top plate 160 may be taken off, carrying with it bearings 34' and the shiftable gearing.

This general type of machine due to its narrow built-in form may be grouped in gangs to occupy a minimum of floor space. As to the machine itself as shown it has the range of speed variations for drive and feed for a most extended use. However, for simple or specific work, the shaft 100 may be omitted and there be but a single shaft 87' to replace the shafts 87, 110, for direct drive by the bevel gears 85, 86, through shaft 87' and bevel gears 111, 112.

The guides 3 for the table 5 are formed by planing straight through for the full length of the column 2. This is a material feature for economy of manufacture. An additional advantage of the toe holds or overhang portions 33, 33' is that there is greater clearance rearward from the spindle for handling large work, and this increases rigidity of the column 2 for holding the head 34.

Figures 14, 15, 16, 17, 18, 19:
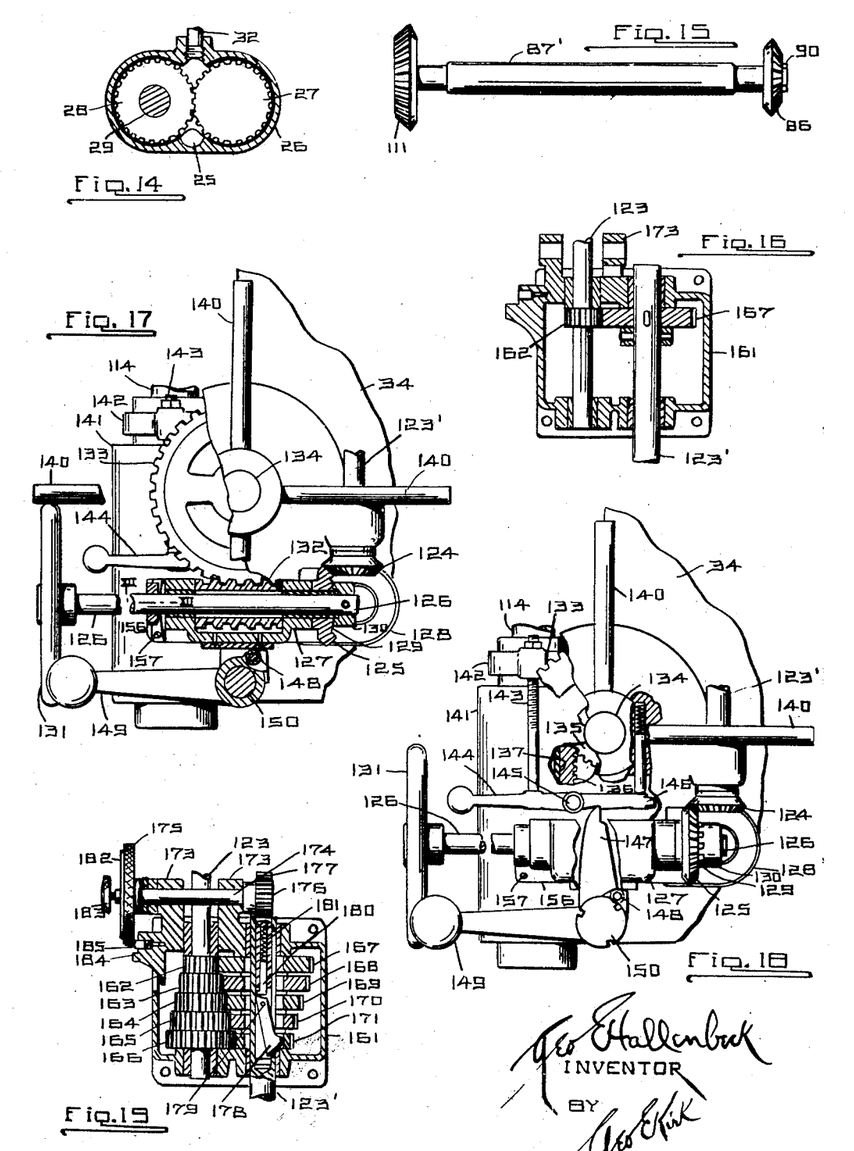
Fig. 14 is a section on the line XIV—XIV, Fig. 11.
Fig. 15 is a detail view of the shaft for a single service construction as a modification using the general construction and merely eliminating certain gearing features.
Fig. 16 is a detail view of the shaft spindle feed rate drive for single service operation installation as a modification using the general construction and merely eliminating certain gearing features.
Fig. 17 is a detail view of features of the spindle feed drive and throw out mechanism.
Fig. 18 is a view of the feed trip and other features of the spindle drive.
Fig. 19 is a fragmentary view of the change speed feed rate control drive for the spindle.

Housing 161 (Fig. 19) is entered by the shaft 123, having fast therein gears 162, 163, 164, 165, 166, respectively in mesh with gears 167, 168, 169, 170, 171, on the drive shaft 123' extending from the housing 161. In bearing 173 on top of the housing 161 is shaft 174 carrying hand wheel 175 at the forward end and pinion 176 at the rearward end in mesh with rack 177 connected to reciprocate dive key 178 pivotally mounted on fulcrum 179 to be thrown by stem 180 as thrust by spring 181. This rack 177 is a bar (Fig. 5) with teeth as rings thereon. This rack 177 rotates with the shaft 123'. Accordingly, the key 178 is yieldably thrown to engage a selected gear 167, 168, 169, 170, 171, on the shaft 123' for thus changing the drive feed rate. Inasmuch as the slip change gears 121, 122, also change the feed rate, an indicator disk 182 (Figs. 3, 5, 19) is detachably mounted on the hand wheel 175 by screw 183. The feed rate for a given set of gears 121, 122, is disclosed by pointer 184, as spring thrown dog 185 holds the wheel 175 in an adjusted position for the selected feed rate as determined by the second change speed gears in the housing 161. The instance shown of disk 182 (Fig. 3) is for change gears 121, 122, as of teeth ratio 28 to 77. For a ratio of 69 to 36 the substitute disk 182 would have indications .100, .072, .052, .036, .026. In the event the machine is not desired for ranges of feed drive change, or changes in addition to that of the gears 121, 122, the shifting feature at the housing 161 may be omitted as shown in Fig. 16.

What is claimed and it is desired to secure by United States Letters Patent is:—

1. A machine tool embodying a main frame including a work table, a spindle opposing said work table and carried by the frame, a drive for the spindle including a shaft extending rearwardly in the frame from the spindle, a second shaft extending at a right angle to and approximately in the plane of the shaft from the spindle, a drive pulley on the second shaft, said spindle carrying frame providing bearings for the second shaft one on each side of the pulley, and transmission connection to the first shaft from the second shaft embodying a third shaft parallel to the second shaft, bevel gear connection between the first and third shafts and spur gear connection between the third and second shafts.

2. A machine tool embodying a main frame, a driven spindle mounted in said frame, change speed gearing for the spindle carried by the frame, said frame providing an upwardly open trough having a drip inward toward the gearing, said frame having a seat adjacent said trough and a housing cap, for the gearing mounted on the frame seat to permit access to the gearing in making speed changes therein independently of disturbing the lubrication of the gearing.

3. A machine tool embodying a main frame, a driven spindle, a drive for the spindle including a first shaft, a second shaft at an angle to the first shaft, bevel gearing therebetween, a bearing for one of said shafts, means for locking the bearing to the bevel gear on its shaft against shifting axially of the shaft, a second bearing on the shaft, and means coacting between the second bearing and the frame for shifting in either direction the first bearing, bevel gear and shaft as to the frame as a unit for adjusting the extent of mesh of the bevel gears.

4. A machine tool drive embodying a shaft, a bevel gear thereon in operation developing thrust axially of the shaft, and anti-friction bearings for the shaft, a frame for the bearing, and bearing embracing means in the frame provided with an inwardly extending flange to engage the bearing to receive the thrust of the shaft theretoward, and said means additionally having an outward flange to engage the frame to transmit the thrust from the means to the frame.

5. A machine tool drive embodying a frame, a shaft in the frame, a bevel gear on the shaft, anti-friction lateral bearings for the shaft, and a holding ring for one of the bearings as to the frame axially of the shaft, said ring embodying an inwardly extending flange for engaging the bearing remote from the thrust direction side of the bevel gear and embodying an outwardly extending flange adjacent the opposite side of the engaged bearing for engaging the frame.

6. A machine tool drive spindle, a sleeve therefor, a frame, two bearings in the frame for laterally coacting with and sustaining said same sleeve, a first gear drive to the sleeve between the bearings for rotating the sleeve and spindle, and through which gearing the sleeve extends into said two bearings and a second gear drive from the sleeve on the upper side of the upper bearing, and a feed drive for the spindle driven by the second gear drive.

7. A machine tool frame providing a cylindrical bearing of uniform diameter, a rotary reciprocable spindle, a first sleeve on the spindle short of the extent of said bearing and mounted in the bearing in said frame to leave a cylinder about said spindle as a piston rod, and a second sleeve fast on the spindle for entering the bearing upon spindle reciprocation toward the first sleeve, said second sleeve co-operating in said bearing as a piston for dash pot control of the spindle reciprocation into said frame.

8. A machine tool frame providing a cylindrical bearing of uniform diameter, a rotary reciprocable spindle, a first sleeve on the spindle short of the extent of said bearing and mounted in the bearing in said frame, and a second sleeve, longitudinally adjustable, fixed on the spindle for entering the bearing upon spindle reciprocation toward the first sleeve, said frame having adjustable vent means whereby the second sleeve may coact with the frame as a controllable dash pot.

9. A machine tool feed drive embodying a frame, a trippable arm having a pivot bearing fixed with said frame, a normally horizontally extending rotary shaft carried by said arm, actuating means for said shaft in different co-operative relation with which said shaft is movable as the arm is tripped, and a guide spaced from said bearing, carried by the frame and extending away from the normal horizontal position of the shaft in providing, with the arm, tongue and groove means interfitting positive to hold the arm in a plane against lateral disturbance during tripping as to said arm.

10. A machine tool comprising a narrow frame, a spindle forwardly of and intermediate the width extent of the frame, a driving pulley rearwardly of and intermediate the width extent of the frame, a horizontal driving shaft mounting the driving pulley, and driving means from the pulley driven shaft to the spindle including a shaft extending toward the spindle and transversely from approximately the plane of the pulley shaft, bearings for the driving shaft on opposite sides of the pulley, an intermediate shaft, gearing connection intermediately the width extent of the frame and between the driven and intermediate shafts, and gearing connection between the intermediate and driving shafts outside said bearings from the pulley.

11. A narrow frame drill press embodying a base, a column and a table support mounted on said base, an overhang mounted on the column, a table guided by the column and adjustable from said support, a spindle mounted in the overhang and extending toward the table, a drive for the spindle including a plurality of horizontal shafts mounted in the overhang and extending away from the spindle, a pair of horizontal shafts at an angle to the shafts extending from the spindle, a driving pulley on one of said lateral shafts and disposed intermediate the planes of the sides of the overhang as extending away from the spindle, gear connections from said shafts to the spindle, a removable cover for the overhang to house said gear connections, a spindle feed carried by the overhang, and driving means from the spindle for said feed, said driving means including gearing mounted in said cover.

12. A machine tool frame having an overhang, a spindle mounted in said overhang, main driving and feed driving gears in the frame for the spindle, a minor top plate removable for access to said feed driving gears, and a removable major top plate having mounted therewith main driving and said latter feed driving gears as made accessible by removal of the minor top plate.

13. A machine tool drive spindle, a sleeve therefor, a frame, a ball bearing in the frame for the sleeve, a second bearing in the frame for the same sleeve, a first gear drive to the sleeve on one side of the ball bearing for rotating the sleeve and spindle, a second gear drive from the sleeve on the other side of the ball bearing, and a feed drive for the spindle driven by the second gear drive.

14. A machine tool frame providing a cylindrical bearing, a rotary reciprocable spindle provided with a shoulder, and a sleeve on the spindle short of the extent of said bearing and mounted in the bearing in said frame, said spindle bearing shoulder and sleeve being fitted whereby said shoulder may enter the bearing upon spindle reciprocation toward the first sleeve for dash pot coaction.

15. A machine tool frame providing a cylindrical bearing, a rotary reciprocable spindle, a first sleeve on the spindle short of the extent of said bearing and mounted in the bearing in said frame, and a second sleeve fixed on the spindle for reciprocation toward the first sleeve, said sleeves being fitted as to the frame, whereby the second sleeve may coact with the frame as a dash pot.

In witness whereof I affix my signature.

GEORGE E. HALLENBECK.